United States Patent [19]
Omi et al.

[11] Patent Number: 5,134,095
[45] Date of Patent: Jul. 28, 1992

[54] MATRIX GLASS COMPOSITION FOR GLASS DOPED WITH DISPERSED MICROCRYSTALLITES

[75] Inventors: Shigeaki Omi, Kawagoe; Katsuaki Uchida, Akishima, both of Japan

[73] Assignee: Hoya Corporation, Tokyo, Japan

[21] Appl. No.: 714,173

[22] Filed: Jun. 14, 1991

[30] Foreign Application Priority Data

Jun. 14, 1990 [JP] Japan .................. 2-156502

[51] Int. Cl.$^5$ ................................ C03C 3/19
[52] U.S. Cl. ...................... 501/47; 501/40; 501/41; 501/32
[58] Field of Search ............ 501/32, 40, 47, 41

[56] References Cited

U.S. PATENT DOCUMENTS

| | | | |
|---|---|---|---|
| 4,026,714 | 5/1977 | Lewis | 501/47 |
| 4,168,176 | 9/1979 | Hirota | 501/47 |
| 4,197,136 | 4/1980 | Inoue et al. | 501/47 |

Primary Examiner—William R. Dixon, Jr.
Assistant Examiner—Chris Gallo
Attorney, Agent, or Firm—Nixon & Vanderhye

[57] ABSTRACT

The present invention relates to a matrix glass composition for glass doped with dispersed $CdS_xSe_yTe_z$ $(x+y+z=1)$ microcrystallites, which contains $P_2O_5$ and/or $B_2O_3$, and ZnO and/or CdO as essential constituent components, in which the total amount of $P_2O_5$ and $B_2O_3$ is in a range of from 35 to 65 mol %, and the total amount of ZnO and CdO is in a range of from 65 to 25 mol %. The present invention relates also to glass doped with dispersed microcrystallites which comprises a matrix glass composition as defined above as matrix glass, and $CdS_xSe_yTe_z$ $(x+y+z=1)$ microcrystallites precipitated in the matrix glass.

7 Claims, 1 Drawing Sheet

MATRIX GLASS COMPOSITION FOR GLASS DOPED WITH DISPERSED MICROCRYSTALLITES

BACKGROUND OF THE INVENTION

1. Field of the Invention

The present invention relates to a glass composition used as matrix glass for glass doped with dispersed $CdS_xSe_yTe_z$ ($x+y+z=1$) microcrystallites used as a nonlinear optoelectronic material, a sharp cut filter glass material or an infrared-transmitting filter glass material.

2. Prior Art

The third order nonlinear characteristic in sharp cut filter glass containing about 100 Å $CdS_xSe_y$ ($x+y=1$) semiconductor microcrystallites dispersed in matrix glass was measured in 1983 (J. Opt. Soc. Am. Vol. 73, No. 5, pp 647-653 (1983). Since that time, public attention has been directed to glass doped with dispersed microcrystallites as a nonlinear optoelectronic material adapted for optical switches, optical computers, etc.

In this type glass doped with dispersed microcrystallites, the dispersion of the energy band caused by a quantum confinement effect is observed. The explanation given to this phenomenon is that the third order nonlinear characteristic is increased by a band filling effect or an exciton confinement effect (for example, as described in a Japanese periodical "Kogaku" Vol. 19, No. 1, pp 10-16 (January 1990)).

In a process of producing this type glass doped with dispersed microcrystallites, in general, silicate glass or borosilicate glass is used as matrix glass. This type glass doped with dispersed microcrystallites, using these kinds of glass as glass matrix, is produced by a method (in general, called "melting method") comprising the steps of: heating and melting a mixture containing starting raw materials for these kinds of glass and starting raw materials for microcrystallites to form a glass melt; cooling the glass melt to room temperature to prepare glass containing constituent elements of the microcrystallites dissolved as ions in the glass matrix; and heating the resulting glass from room temperature to a predetermined temperature and applying heat treatment at the predetermined temperature to the glass to precipitate microcrystallites.

In the case where glass doped with dispersed microcrystallites is produced by the conventional melting method with silicate glass or borosilicate glass as matrix glass, the solubility in the matrix glass, of S, Se and Te components as constituent elements of microcrystallites is very low and these components volatilize during the step of heating and melting the starting raw materials to prepare glass containing constituent elements of microcrystallites dissolved in the matrix glass. Accordingly, even if large amounts of the staring raw materials for microcrystallites are added to the glass raw materials, the concentration of the S, Se and Te components in the glass cannot be increased. Accordingly, the concentration of microcrystallites precipitated by heat treatment is limited to a value lower than 5 wt % (volume percent of microcrystals: 2 vol %), as described in Japanese Patent Postexamin. Publication No. Sho-48-8561.

In the case where a nonlinear optoelectronic element for optical switches, optical computers, etc. is produced by using the glass doped with dispersed microcrystallites produced by the conventional melting method, the value ($\chi^{(3)}$) of nonlinear susceptibility expressing the magnitude of the third order nonlinear characteristic is not higher than $10^{-8}$ esu, because it is proportional to the volume percent of microcrystallites in the glass doped with dispersed microcrystallites as described in the above "Kogaku" Vol. 19, No. 1, pp 10-16 (January 1990), thereby making it difficult to operate the nonlinear optoelectronic element through the intensity of light from a semiconductor laser. Further, in the case where a thin sharp cut filter or an infrared-transmitting filter is produced, the rising of the light absorption curve is broad and has a gentle slope, thereby making it difficult to attain reduction in thickness of the optical filter while keeping the characteristic of the optical filter.

The present invention has been attained to solve the aforementioned problems in the conventional glass doped with dispersed microcrystallites as a nonlinear optoelectronic material and an optical filter material, and it is a first object thereof is to provide a matrix glass composition in which the solubility of microcrystallites is high.

It is a second object of the present invention to provide glass doped with dispersed microcrystallites, which contains a high concentration of $CdS_xSe_yTe_z$ ($x+y+z=1$) microcrystallites.

SUMMARY OF THE INVENTION

To attain the foregoing objects of the present invention, the matrix glass composition for glass doped with dispersed $CdS_xSe_yTe_z$ ($x+y+z=1$) microcrystallites according to the present invention contains $P_2O_5$ and/or $B_2O_3$, and ZnO and/or CdO as essential constituent components, in which the total amount of $P_2O_5$ and $B_2O_3$ is in a range of from 35 to 65 mol %; and the total amount of ZnO and CdO is in a range of from 65 to 25 mol %.

Further, the glass doped with dispersed microcrystallites according to the present invention comprises a matrix glass composition as defined above as matrix glass, and $CdS_xSe_yTe_z$ ($x+y+z=1$) microcrystallites being precipitated in the matrix glass.

According to a preferred embodiment of the present invention, the total amount of $P_2O_5$ and $B_2O_3$ is in a range of from 40 to 65 mol % and the total amount of ZnO and CdO is in a range of from 60 to 35 mol %. Further, according to a preferred embodiment of the present invention, the sum of the total amount of $P_2O_5$ and $B_2O_3$ and the total amount of ZnO and CdO is not smaller than 80 mol %.

DETAILED DESCRIPTION OF THE INVENTION

Figure 1:
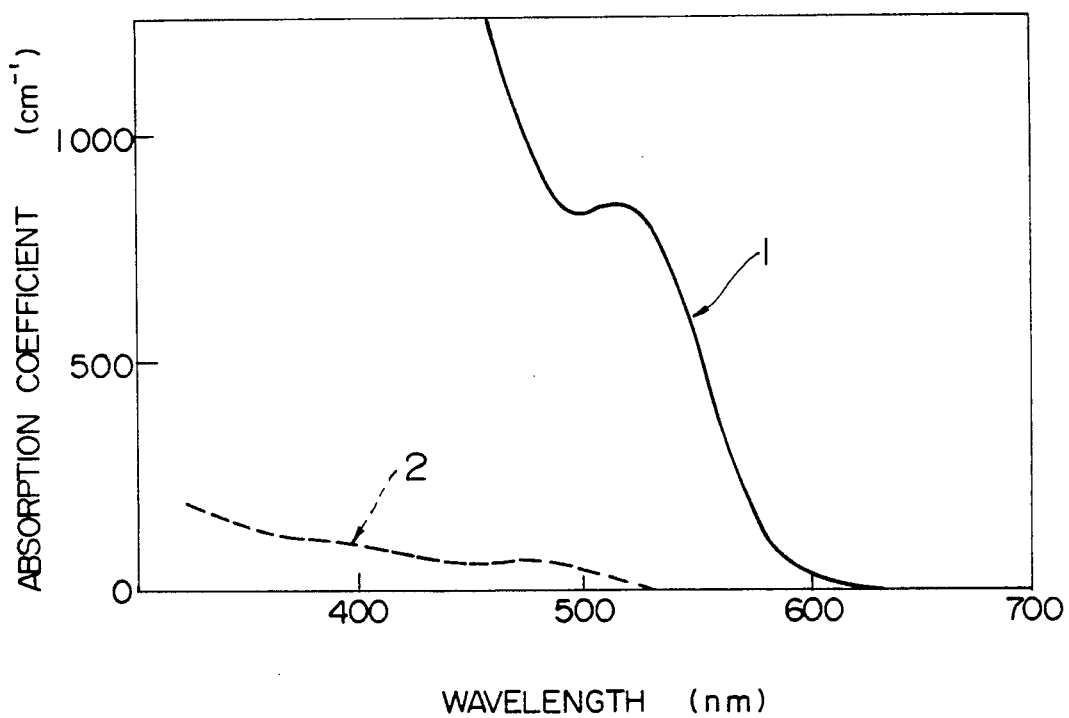
FIG. 1 is a graph showing the light absorption curve of the glass doped with dispersed CdSe microcrystallites produced in Example 1 according to the present invention.

The present invention will be described in detail hereunder.

The reason why the matrix glass composition for glass doped with dispersed microcrystallites according to the present invention contains $P_2O_5$ and/or $B_2O_3$, and ZnO and/or CdO is that the solubility in the glass melt, of S, Se and Te components as constituent elements of $CdS_xSe_yTe_z$ ($x+y+z=1$) microcrystallites is increased so that the volatilization of the S, Se and Te components from the glass melt is suppressed to produce glass having a high concentration of S, Se and Te components.

The reason why the proportion of the components in the matrix glass composition is limited as described above is as follows.

That is, if the total amount of $P_2O_5$ and $B_2O_3$ is smaller than 35 mol %, the thermal stability of the matrix glass becomes so insufficient that crystals are undesirably easily precipitated from the matrix glass in the step of heat treatment for precipitating $CdS_xSe_yTe_z$ ($x+y+z=1$) microcrystallites. If the total amount of $P_2O_5$ and $B_2O_3$ is larger than 65 mol %, the chemical durability of the matrix glass becomes so insufficient that a problem in use arises. Accordingly, the total amount of $P_2O_5$ and $B_2O_3$ is limited to a range of from 35 to 65 mol %. It is particularly preferable that the total amount of $P_2O_5$ and $B_2O_3$ is in a range of from 40 to 65 mol %.

If the total amount of ZnO and CdO is larger than 65 mol %, the thermal stability of the matrix glass becomes so insufficient that crystals are undesirably easily precipitated from the matrix glass in the step of heat treatment. If the total amount of ZnO and CdO is smaller than 25 mol %, the chemical durability of the matrix glass undesirably becomes insufficient. Accordingly, the total amount of ZnO and CdO is limited to a range of from 65 to 25 mol %. It is particularly preferable that the total amount of ZnO and CdO is in a range of from 60 to 35 mol %.

The matrix glass composition can contain alkali metal oxides, alkaline-earth metal oxides, $ZrO_2$, $TiO_2$, PbO, $SiO_2$, $Al_2O_3$, $As_2O_3$, $Sb_2O_3$, etc. as optional components in addition to the aforementioned matrix glass components, but the total amount of these optional components must be not larger than 25 mol %. The reason is as follows. If the total amount of those optional components is larger than 25 mol %, the solubility of S, Se and Te components as constituent elements of $CdS_xSe_yTe_z$ ($x+y+z=1$) microcrystallites, in glass melted by a melting method becomes so low that the S, Se and Te components beyond their solubility volatilize from the melt. In this case, the concentration of S, Se and Te components remaining in the glass cannot be increased even if the concentration of S, Se and Te components in the raw material is increased, so that the concentration of $CdS_xSe_yTe_z$ ($x+y+z=1$) microcrystallites precipitated by heat treatment cannot be increased.

The matrix glass components and the $CdS_xSe_yTe_z$ ($x+y+z=1$) microcrystallite components can be mixed in various ratios to form a mixture. Glass doped with dispersed microcrystallites, containing $CdS_xSe_yTe_z$ ($x+y+z=1$) microcrystallites precipitated in matrix glass, can be produced by applying heat treatment to this mixture after melting it to form a melt.

As described above, in the matrix glass composition according to the present invention, the solubility in the glass melt, of S, Se and Te components as constituent elements of $CdS_xSe_yTe_z$ ($x+y+z=1$) microcrystallites is so high that volatilization of the S, Se and Te components from the melt is suppressed to produce glass having a high concentration of S, Se and Te components remaining in the melt. Accordingly, glass doped with dispersed microcrystallites, in which the concentration of microcrystallites precipitated by heat treatment is not lower than 5 wt % which cannot be attained by the prior art type process, can be produced by suitably selecting the amounts of microcrystallite materials used, the conditions of heat treatment for precipitating the microcrystallites, etc.

The present invention will be described more in detail based on various examples thereof.

EXAMPLE 1

A composition consisting of 50 mol % of $P_2O_5$ and 50 mol % of ZnO was used as a matrix glass raw material. A mixture prepared by mixing 4 mol % of CdSe as a microcrystallite raw material with 100 mol % of the above composition was heated in a refractory crucible at 1200° C. for 15 minutes to prepare a uniform glass melt and then cast in the form of an iron plate to produce colorless transparent glass.

In the glass thus produced, the concentration of Se which is liable to volatilize, measured through chemical analysis was 2.5 wt %. The concentration was almost equal to the theoretical concentration (2.6 wt %) which is a concentration at which Se does not volatilize at all. This means that volatilization of Se from the microcrystallite raw material was suppressed when glass was melted.

Then, the glass thus produced was put into an electric furnace which was kept at 430° C. in advance. After the glass was heated at this temperature for 16 hours, it was cooled slowly to room temperature. The glass thus produced was colored red.

When the glass thus produced was measured by using an X-ray diffraction, a CdSe crystal peak was observed so that it was confirmed that glass doped with dispersed CdSe microcrystallites was produced. When the size of CdSe microcrystallites contained in the glass doped with dispersed CdSe microcrystallites was then measured by using an X-ray diffraction and a transmitting electron microscope (TEM), the mean particle size (diameter) of the CdSe microcrystallites was 30 Å.

When the light absorption spectrum of the thus produced glass doped with dispersed CdSe microcrystallites was then measured after the glass was optically polished to a thickness of 50 μm, a sharp absorption peak as expressed by the solid line 1 in FIG. 1 was observed so that a quantum confinement effect was confirmed. Further, the rising of the light absorption curve was so sharp that it was confirmed that the glass had an excellent spectroscopic characteristic. Further, the amount of light absorption was increased by ten times or more compared with that of a sharp cut filter glass (Y52 CdSe: 0.5 mol %, 1.0 wt %, manufactured by HOYA CORPORATION) expressed by the broken line 2 in FIG. 1 as a comparative example. Accordingly, the concentration of microcrystallites in the glass doped with dispersed CdSe microcrystallites in this example was then times or more than the concentration of microcrystallites in the commercially available sharp cut filter glass. The $\chi^{(3)}$ value measured at room temperature at a wavelength (520 nm) near the light absorption peak by a degenerated four wave mixing method was $2 \times 10^{-7}$ (esu). Accordingly, the glass doped with dispersed CdSe microcrystallites had an optical nonlinear sensitivity ($\chi^{(3)}$) which is ten times or more than that of the commercially available sharp cut filter glass.

EXAMPLES 2 TO 23

Various glasses were produced in the same manner as in Example 1, except that matrix glass compositions as shown in Table 1 were used. Then, the glasses were heated under the conditions as shown in Table 1 and then cooled slowly to room temperature. The glasses obtained were colored.

The colored glasses produced in Examples 2 to 23 were measured by using an X-ray diffraction, and a CdSe crystal peak was observed in every colored glass similarly to Example 1. Thus it was confirmed that glass doped with dispersed CdSe microcrystallites was produced. The light absorption characteristics in the glasses doped with dispersed CdSe microcrystallites were then measured in the same manner as in Example 1, and a sharp absorption peak was observed in every glass doped with dispersed CdSe microcrystallites similarly to that produced in Example 1. Thus it was confirmed that they have quantum confinement effect. Further, in every glass doped with dispersed CdSe microcrystallites, the rising of the light absorption curve was so sharp that it was confirmed that the glass had an excellent spectroscopic characteristic. The concentrations of CdSe microcrystallites in the glasses doped with dispersed CdSe microcrystallites were respectively calculated from the light absorption characteristics thereof. As the result, the concentrations were in a range of from 5 to 47 times as high as the concentration of microcrystallites in the commercially available sharp cut filter glass (Y52 manufactured by HOYA CORPORATION) as shown in Table 1. Therefore, the glasses doped with dispersed CdSe microcrystallites had an optical nonlinear susceptibility ($\chi^{(3)}$) which is 5 times or more than that of the commercially available sharp cut filter glass.

COMPARATIVE EXAMPLE 1

Glass was produced in the same manner as in Example 1, except that 30 mol % of $P_2O_5$ and 70 mol % of ZnO which are out of the range defined in the present invention were used as a matrix glass composition.

The concentration of Se in the glass measured through chemical analysis was 0.1 wt % which was about 5% of the theoretical concentration (2.1 wt %) which is a concentration at which Se does not volatilize at all. This means that Se in the microcrystallite raw material was lost by 95% due to volatilization when glass was melted.

Though the glass was then heated at 400° C. for one hour, there was no color change and precipitation of CdSe microcrystallites could not be observed by an X-ray diffraction and in the measurement of light absorption spectrum.

COMPARATIVE EXAMPLE 2

Glass was produced in the same manner as in Example 1, except that 70 mol % of $P_2O_5$ and 30 mol % of ZnO which are out of the range defined in the present invention were used as a matrix glass composition.

The concentration of Se in the thus produced glass measured through chemical analysis was lower than 0.05 wt % which was a measurement limit. This means that almost of Se in the microcrystallite raw material was lost due to volatilization when glass was melted.

Though the glass was then heated at 450° C. for one hour, there was no color change and precipitation of CdSe microcrystallites could not be observed through an X-ray diffraction and through the measurement of light absorption spectrum.

COMPARATIVE EXAMPLE 3

Glass was produced in the same manner as in Example 1, except that 50 mol % of $P_2O_5$ and 50 mol % of CaO (CaO being not an essential component in the present invention) which are out of the range defined in the present invention were used as a matrix glass composition.

The concentration of Se in the thus produced glass was measured through chemical analysis, and it was confirmed that Se in the microcrystallite raw material was lost by about 90% due to volatilization when glass was melted.

After the glass was then heated at 530° C. for one hour, a color change was observed. The concentration of CdSe microcrystallites in the glass doped with dispersed CdSe microcrystallites was calculated from the light absorption characteristic thereof. As the result, the concentration was as low as 0.8 time the concentration of microcrystallites in the commercially available sharp cut filter glass (Y52 manufactured by HOYA CORPORATION), as shown in Table 1.

COMPARATIVE EXAMPLE 4

Glass was produced in the same manner as in Example 1, except that 50 mol % of $SiO_2$ ($SiO_2$ being not an essential component in the present invention), 40 mol % of ZnO, and 10 mol % of $K_2O$ ($K_2O$ being not an essential component in the present invention) which are out of the range defined in the present invention were used as a matrix glass composition and that the composition was heated at 1400° C. for 30 minutes to form a uniform glass melt.

The concentration of Se in the thus produced glass was measured through chemical analysis, and it was confirmed that Se in the microcrystallite raw material was lost by about 90% due to volatilization when glass was melted.

After the glass was then heated at 640° C. for one hour, a color change was observed. The concentration of CdSe microcrystallites in the glass doped with dispersed CdSe microcrystallites was calculated from the light absorption characteristic thereof. As the result, the concentration was as low as 0.5 time the concentration of microcrystallites in the commercially available sharp cut filter glass (Y52 manufactured by HOYA CORPORATION), as shown in Table 1.

TABLE 1

| | Example 1 | Example 2 | Example 3 | Example 4 | Example 5 | Example 6 | Example 7 | Example 8 | Example 9 |
|---|---|---|---|---|---|---|---|---|---|
| $P_2O_5$ mol % | 50 | | 65 | 60 | 40 | 35 | 50 | 50 | 50 |
| $B_2O_3$ mol % | | 50 | | | | | | | |
| Subtotal mol % | 50 | 50 | 65 | 60 | 40 | 35 | 50 | 50 | 50 |
| ZnO mol % | 50 | 50 | 35 | 40 | 60 | 65 | 40 | 30 | 20 |
| CdO mol % | | | | | | | 10 | 20 | 30 |
| Subtotal mol % | 50 | 50 | 35 | 40 | 60 | 65 | 50 | 50 | 50 |
| Total mol % | 100 | 100 | 100 | 100 | 100 | 100 | 100 | 100 | 100 |
| Others | | | | | | | | | |
| CdSe mol %* | 4 | 2.5 | 4 | 4 | 4 | 4 | 4 | 4 | 4 |
| Concentration of | 11 | 9 | 8 | 12 | 9 | 7 | 12 | 12 | 11 |

TABLE 1-continued

| | | | | | | | | | |
|---|---|---|---|---|---|---|---|---|---|
| precipitated CdSe wt % | | | | | | | | | |
| Relative value of concentration of CdSe microcrystallites** | 11 | 9 | 8 | 12 | 9 | 7 | 12 | 12 | 11 |
| Heat treatment conditions | 430° C. 16 hrs | 580° C. 3 hrs | 450° C. 1 hr | 450° C. 1 hr | 430° C. 16 hrs | 430° C. 1 hr | 430° C. 2 hrs | 430° C. 2 hrs | 430° C. 2 hrs |

| | Example 10 | Example 11 | Example 12 | Example 13 | Example 14 | Example 15 | Example 16 | Example 17 | Example 18 |
|---|---|---|---|---|---|---|---|---|---|
| $P_2O_5$ mol % | 25 | 47.5 | 47.5 | 47.5 | 47.5 | 47.5 | 47.5 | 45 | 55 |
| $B_2O_3$ mol % | 25 | | | | | | | | |
| Subtotal mol % | 50 | 47.5 | 47.5 | 47.5 | 47.5 | 47.5 | 47.5 | 45 | 55 |
| ZnO mol % | 50 | 47.5 | 47.5 | 47.5 | 47.5 | 47.5 | 47.5 | 45 | 25 |
| CdO mol % | | | | | | | | | |
| Subtotal mol % | 50 | 47.5 | 47.5 | 47.5 | 47.5 | 47.5 | 47.5 | 45 | 25 |
| Total mol % | 100 | 95 | 95 | 95 | 95 | 95 | 95 | 90 | 80 |
| Others | | $5Na_2O$ | $5K_2O$ | 5MgO | 5CaO | 5SrO | 5BaO | 10BaO | 20BaO |
| CdSe mol %* | 4 | 4 | 4 | 4 | 4 | 4 | 4 | 4 | 4 |
| Concentration of precipitated CdSe wt % | 11 | 10 | 11 | 9 | 10 | 9 | 9 | 7 | 5 |
| Relative value of concentration of CdSe microcrystallites** | 11 | 10 | 11 | 9 | 10 | 9 | 9 | 7 | 5 |
| Heat treatment conditions | 500° C. 30 min | 400° C. 2 hrs | 400° C. 16 hrs | 450° C. 1 hr | 450° C. 1 hr | 450° C. 1 hr | 450° C. 1 hr | 450° C. 8 hrs | 500° C. 8 hrs |

| | Example 19 | Example 20 | Example 21 | Example 22 | Example 23 | Cmp. Exp 1 | Cmp. Exp 2 | Cmp. Exp 3 | Comp Exp 4 |
|---|---|---|---|---|---|---|---|---|---|
| $P_2O_5$ mol % | 45 | 45 | 50 | 50 | 50 | 30 | 70 | 50 | |
| $B_2O_3$ mol % | | | | | | | | | |
| Subtotal mol % | 45 | 45 | 50 | 50 | 50 | 30 | 70 | 50 | 0 |
| ZnO mol % | 45 | 30 | 50 | 30 | 25 | 70 | 30 | | 40 |
| CdO mol % | | 15 | | 20 | 25 | | | | |
| Subtotal mol % | 45 | 45 | 50 | 50 | 50 | 70 | 30 | 0 | 40 |
| Total mol % | 90 | 90 | 100 | 100 | 100 | 100 | 100 | 50 | 40 |
| Others | $5K_2O$ $5BaO$ | 10BaO | | | | | | 50CaO | $50SiO_2$ $10K_2O$ |
| CdSe mol %* | 4 | 4 | 7 | 12 | 15 | 4 | 4 | 4 | 4 |
| Concentration of precipitated CdSe wt % | 6 | 7 | 20 | 27 | 47 | 0 | 0 | 0.8 | 0.5 |
| Relative value of concentration of CdSe microcrystallites** | 6 | 7 | 20 | 27 | 47 | 0 | 0 | 0.8 | 0.5 |
| Heat treatment conditions | 430° C. 2 hrs | 450° C. 1 hr | 430° C. 16 hrs | 430° C. 16 hrs | 430° C. 16 hrs | 400° C. 1 hr | 450° C. 1 hr | 530° C. 1 hr | 640° C. 1hr |

*This shows mol % of CdSe added to 100 mol % of the glass matrix composition.
**This shows the relative value of the concentration of microcrystallites in glass doped with dispersed microcrystallites in each of examples and comparative examples when the concentration (1.0 wt %) of microcrystallites in the conventional sharp cut filter glass (Y52 manufactured by HOYA CORPORATION) is regarded as 1.

EXAMPLES 24 TO 28

Glasses were produced in the same manner as in Example 1, except that matrix glass compositions and microcrystallite components of $CdS_xSe_yTe_z$ (x+y+z=1) as shown in Table 2 were used. Thereafter, the glasses were heated under the conditions as shown in Table 2 and then cooled slowly to room temperature. The glass obtained were colored.

The colored glasses thus produced in Examples 24 to 28 were measured by using an X-ray diffraction, a crystal peak was observed in every colored glass similarly to Example 1 and it was confirmed that glasses doped with dispersed microcrystallites were produced. The light absorption characteristics in the glasses doped with dispersed microcrystallites were then measured in the same manner as in Example 1, and a sharp absorption peak was observed in every glass similarly to the glass doped with dispersed CdSe microcrystallites produced in Example 1. Thus it was confirmed that every glass has quantum confinement effect. Further, in every glass, the rising of the light absorption curve was so sharp that it was confirmed that the glass had an excellent spectroscopic characteristic. The concentrations of microcrystallites in the glasses doped with microcrystallites were respectively calculated from the light absorption characteristics thereof. As the result, the concentrations of microcrystallites were as high as 8 times or more than the concentration of microcrystallites in the commercially available sharp cut filter glass (Y52 manufactured by HOYA CORPORATION), as shown in Table 2. The glasses doped with dispersed CdSe microcrystallites had an optical nonlinear susceptibility ($\chi^{(3)}$) which is 8 times or more than that of the commercially available sharp cut filter glass.

COMPARATIVE EXAMPLE 5

Glass was produced in the same manner as in Example 1, except that 30 mol % of $B_2O_3$ and 70 mol % of ZnO which are out of the range defined in the present invention were used as a matrix glass composition and that 2.5 mol % of $CdS_{0.2}Se_{0.6}Te_{0.2}$ per 100 mol % of the matrix glass composition was used as a microcrystallite component.

The concentration of Se in the thus produced glass was measured through chemical analysis, and it was confirmed that almost of S, Se and Te in the microcrystallite raw material were lost due to volatilization when glass was melted.

Though the glass was then heated at 550° C. for three hours, there was no color change and precipitation of $CdS_xSe_yTe_z$ (x+y+z=1) microcrystallites could not be observed by an X-ray diffraction and in the measurement of light absorption spectrum.

TABLE 2

|  | Example 24 | Example 25 | Example 26 | Example 27 | Example 28 | Cmp. Exp 6 |
|---|---|---|---|---|---|---|
| $P_2O_5$ mol % | 50 |  |  | 50 | 45 |  |
| $B_2O_3$ mol % |  | 50 | 50 | 50 | 45 | 30 |
| Subtotal mol % | 50 | 50 | 50 | 50 | 45 | 30 |
| ZnO mol % | 50 | 50 | 50 | 50 | 45 | 70 |
| CdO mol % |  |  |  |  |  |  |
| Subtotal mol % | 50 | 50 | 50 | 50 | 45 | 70 |
| Total mol % | 100 | 100 | 100 | 100 | 90 | 100 |
| Others |  |  |  |  | 5$K_2O$ 5BaO |  |
| $CdS_xSe_yTe_z$ mol %* | 4 | 2.5 | 3 | 4 | 2.5 | 2.5 |
| Microcrystallite composition $CdS_xSe_yTe_z$ |  |  |  |  |  |  |
| x | 0.5 | 0.5 | 1 | 0.2 | 0.2 | 0.2 |
| y | 0.5 | 0.4 |  | 0.6 | 0.8 | 0.6 |
| z |  | 0.1 |  | 0.2 |  | 0.2 |
| Concentration of precipitated microcrystallites wt % | 10 | 8 | 12 | 9 | 8 | 0 |
| Relative value of concentration of microcrystallites** | 10 | 8 | 12 | 9 | 8 | 0 |
| Heat treatment conditions | 430° C. 16 hrs | 580° C. 3 hrs | 580° C. 3 hrs | 580° C. 3 hrs | 550° C. 1 hr | 550° C. 3 hrs |

*This shows mol % of $CdS_xSe_yTe_z$ added to 100 mol % of the glass matrix composition.
**This shows the relative value of the concentration of microcrystallites in glass doped with dispersed microcrystallites in each of examples and a comparative example when the concentration (1.0 wt %) of microcrystallites in the conventional sharp cut filter glass (Y52 manufactured by HOYA CORPORATION) is regarded as 1.

As described above, according to the present invention, glass doped with dispersed $CdS_xSe_yTe_z$ (x+y+z=1) microcrystallites, having a very higher concentration of microcrystallites than the conventional sharp cut filter glass, can be produced by using the aforementioned matrix glass composition. The thus produced glass doped with microcrystallites has not only an excellent nonlinear characteristic to be used as a nonlinear optical material but an excellent spectroscopic characteristic to be used as a filter material.

We claim:

1. A matrix glass composition for glass doped with dispersed $CdS_xSe_yTe_z$ (x+y+z=1) microcrystallites, characterized in that it contains $P_2O_5$ and/or $B_2O_3$, and ZnO and/or CdO as essential constituent components, and in that the total amount of $P_2O_5$ and $B_2O_3$ is in a range of from 35 to 65 mol %, and the total amount of ZnO and CdO is in a range of from 65 to 25 mol %.

2. A composition according to claim 1, wherein the total amount of $P_2O_5$ and $B_2O_3$ is in a range of from 40 to 65 mol %.

3. A composition according to claim 1, wherein the total amount of ZnO and CdO is in a range of from 60 to 35 mol %.

4. A composition according to claim 1, wherein it further contains at least one additional component selected from the group consisting of alkali metal oxides, alkaline-earth metal oxides, $ZrO_2$, $TiO_2$, PbO, $SiO_2$, $Al_2O_3$, $As_2O_3$ and $Sb_2O_3$.

5. A composition according to claim 4, wherein the amount of said additional component is not larger than 25 mol %.

6. Glass doped with dispersed microcrystallites, which comprises a matrix glass composition as defined in any one of claims 1 to 5 as matrix glass, and $CdS_xSe_yTe_z$ (x+y+z=1) microcrystallites precipitated in said matrix glass.

7. Glass doped with dispersed microcrystallites according to claim 6, wherein the concentration of said $CdS_xSe_yTe_z$ (x+y+z=1) microcrystallites is not lower than 5 wt %.

* * * * *